June 21, 1938. J. WOO 2,121,516
CONDIMENT RECEPTACLE
Filed Oct. 18, 1937 2 Sheets-Sheet 1
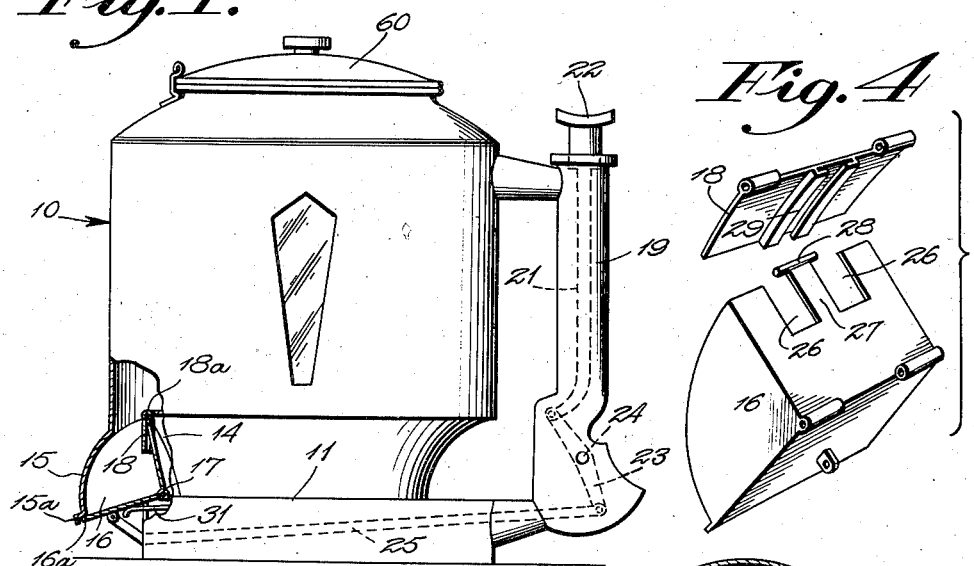
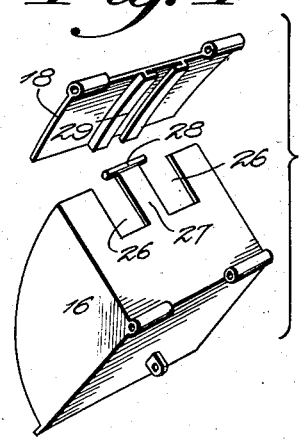
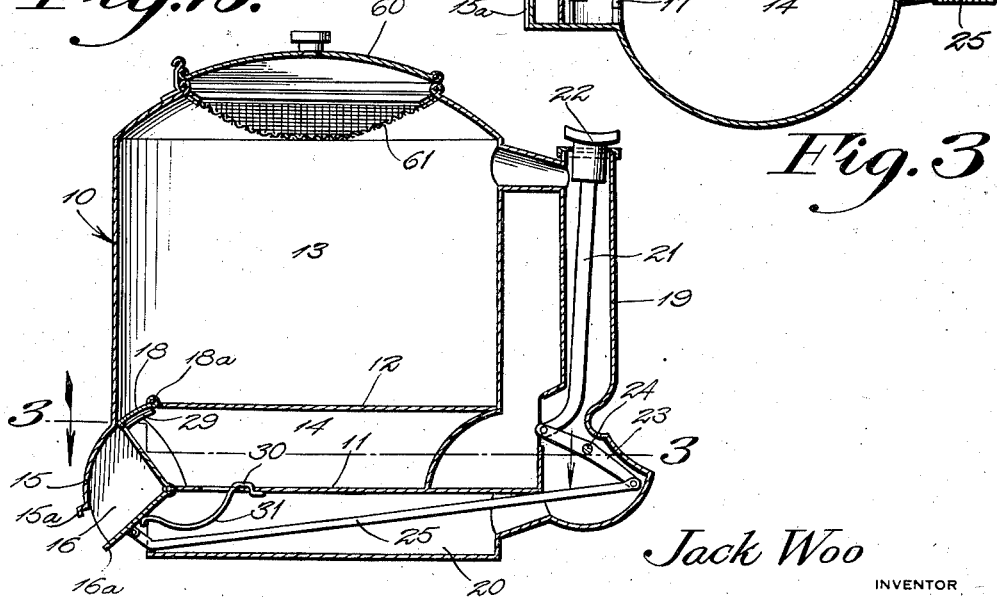
Jack Woo
INVENTOR
BY Victor J. Evans & Co.
ATTORNEYS June 21, 1938. J. WOO 2,121,516
CONDIMENT RECEPTACLE
Filed Oct. 18, 1937 2 Sheets-Sheet 2
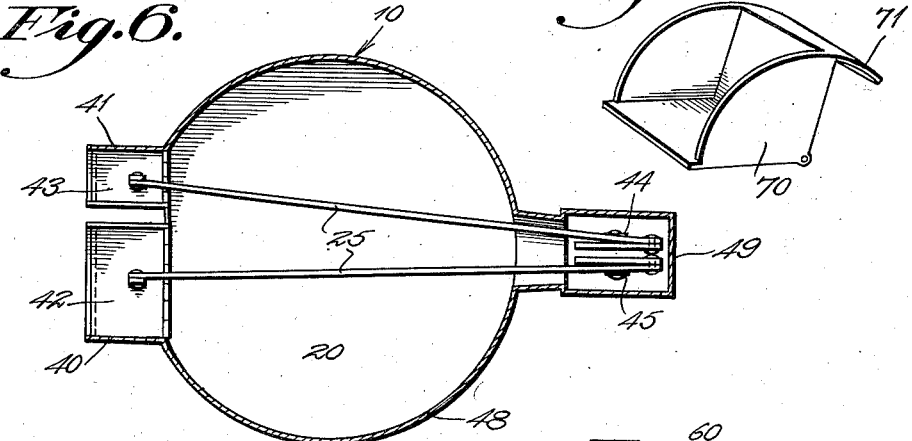
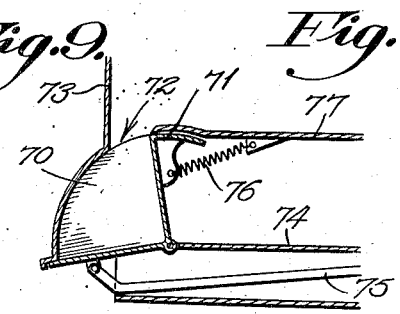
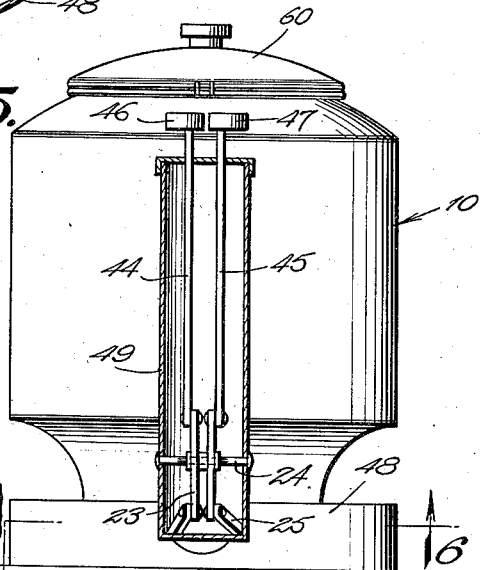
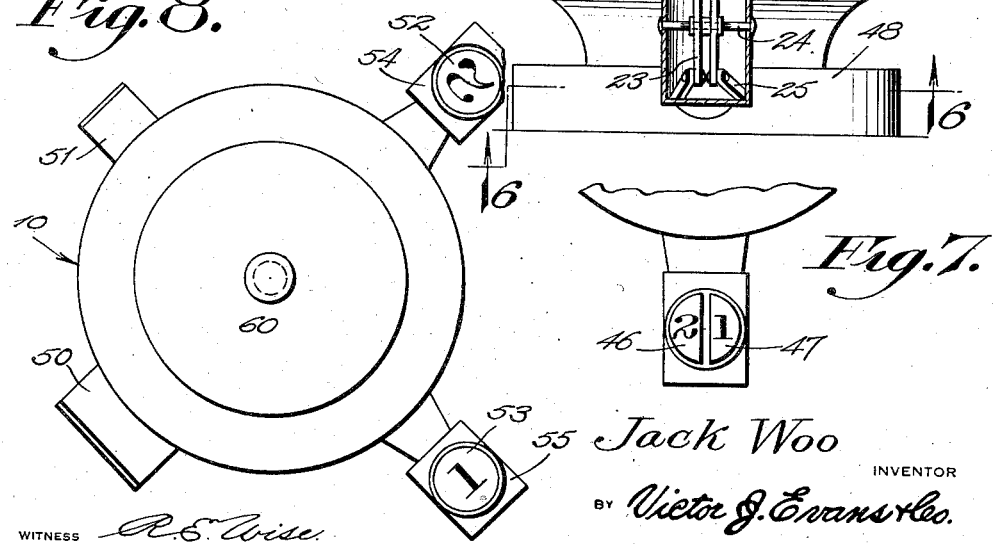
Jack Woo
INVENTOR Patented June 21, 1938

2,121,516

UNITED STATES PATENT OFFICE 2,121,516

CONDIMENT RECEPTACLE

Jack Woo, Port Alice, British Columbia, Canada

Application October 18, 1937, Serial No. 169,743

4 Claims. (Cl. 221—112)

My invention relates to condiment receptacles and more particularly to that class equipped with measuring and dispensing means.

One of the principal objects of my invention is to provide a condiment receptacle equipped with means for measuring and dispensing a desired amount of condiment.

Another object of my invention is to provide a device of the above described character wherein a predetermined amount of condiment is easily and quickly discharged therefrom.

A further object of my invention is to provide a device of the above described character which is simple in construction, positive in operation, durable in use and economical in manufacture.

Other objects and advantages will be apparent from the following description, appended claims and annexed drawings.

Referring to the drawings wherein like reference characters designate like parts throughout the several views:

Fig. 1 is a side elevation, partly in section, of my invention illustrating the measuring container in closed position.

Fig. 2 is a vertical section thereof illustrating the measuring container in dispensing or discharging position.

Fig. 3 is a sectional view taken on a line 3—3 of Figure 2.

Fig. 4 is a detail disassembled perspective view of the measuring container and valve.

Fig. 5 is a rear elevation, partly in section, of a modified form.

Fig. 6 is a sectional view taken on a line 6—6 of Figure 5.

Fig. 7 is a detail top plan view illustrating a portion of the means for operating the measuring containers illustrated in Figures 5 and 6.

Fig. 8 is a top plan view of another modified form.

Fig. 9 is a detail sectional view of a still further modification.

Fig. 10 is a perspective view of the container illustrated in Figure 8.

In practicing my invention I provide a condiment receptacle 10 having a bottom 11 and a partition 12 forming upper and lower chambers 13 and 14 respectively.

In the preferred embodiment illustrated in Figures 1 to 4 inclusive a spout 15 is provided on the lower end of the container and extends from the lower chamber 14. A measuring container 16 is pivoted to the bottom as at 17 and is operable in the spout 15. A valve 18 is pivoted above the container 16 to the partition 12 as at 18a and is connected to the container as hereinafter described.

The receptacle is fashioned with a rearwardly extending handle 19 of hollow construction, the lower end of which terminates in a right angularly disposed hollow base 20 which serves to space the bottom 11 from a support such as a table top or the like. The handle 19 has located therein a depressible rod 21, the upper end of which is provided with a finger piece or button 22 and the lower end pivotally connected to one end of a bell crank lever 23 pivotally mounted in the lower end of the handle 19 as at 24. The other end of the bell crank lever has pivotally connected thereto a connecting arm 25 extending through the hollow base 20 and effecting pivoted connection with the measuring container 16.

The measuring container 16 comprises side, bottom and rear walls, the side walls being of arcuate configuration to conform to the arcuate configuration of the spout 15. The upper section of the rear wall of the container 16 is segmented to form slots 26 and an intermediate member 27, said member fashioned on the upper member thereof with a pintle 28 having laterally extending ends. The lower side of the valve 18 is formed with a pair of oppositely disposed guide members 29 in which the ends of the pintle 28 are adapted to operate. Actuation of the container through the medium of the thumb piece 22 and connected parts will cause the valve 18, connected thereto by the pintle and guide members, to be actuated to a closed position when the container is moved to an open position as illustrated in Figure 2 and to be actuated to an open position when the container is moved to a closed position as illustrated in Figure 1. Within the base 20 and secured to the bottom as at 30 is a spring 31 engaging the bottom wall of the container 16. When the container 16 is actuated to dispensing or discharge position against the tension of the spring 31, the spring will return the container to closed position upon release of the finger piece 22 by the operator.

To prevent leakage of the condiment when the container is in the closed position the lower wall of the container is formed with an outwardly extending lip 16a adapted to seat within a recess formed by an offset shoulder 15a fashioned on the lower end of the spout 15 as clearly illustrated in Figure 1.

From the foregoing it will be apparent that a predetermined amount of condiment contained in the upper chamber 13 will flow into the container 16 when the valve 18 is in the open position as illustrated in Figure 1. The size of the container is such as to receive a predetermined amount of the condiment, for instance one teaspoon full. Upon actuation of the finger piece 22 the container 16 is moved to the discharge position as illustrated in Figure 2 thereby dispensing or discharging the condiment contained therein. In this position the valve 18 is closed and prevents condiment in the chamber 13 from flowing below the partition 12. However, if it should be desired to vary the amount of condiment desired for use upon some special occasion the finger piece 22 is actuated in a manner to position the container 16 in an intermediate position, thereby partly closing the valve 18 and permitting additional condiment to flow into the container and be discharged from the container until release of the finger piece 22 and actuation of the container to closed position by the spring 31.

In the modified form illustrated in Figures 5 to 7 inclusive the receptacle is provided with a pair of spouts 40 and 41 in which are operable containers 42 and 43 respectively. Suitable valves are connected to each of the containers and of a like construction and operation as in the instance of the preferred embodiment herein described and illustrated. Each of the containers are operated by independent manually operable means, the upper ends of the rods 44 and 45 being provided with finger pieces 46 and 47 respectively. The containers 42 and 43 are of a size to receive and dispense different quantities of condiment in relation to each other and the finger pieces 46 and 47 are provided with suitable indicia indicating such amounts. The spouts 40 and 41 are fashioned on the receptacle adjacent each other and the manually operable means extend through the base 48 and hollow handle 49 as clearly illustrated in Figures 5 and 6. In this construction, a user or operator may dispense the contents of either one of the containers or both simultaneously by operation of the finger piece.

In the modified form illustrates in Figure 8 the spouts 50 and 51 are fashioned on the receptacle at right angles relative to each other and are each provided with finger pieces 52 and 53 respectively for operating the respective connected mechanisms located in right angularly disposed handles 54 and 55 and the base.

The receptacles in both the preferred and modified forms are fashioned at their upper ends with a hinge cover 60 and a strainer 61 for straining the condiment introduced into the receptacle.

In the modified form illustrated in Figures 9 and 10, the measuring container 70 is fashioned with a laterally and outwardly extending section 71 at the top thereof and which section forms a valve for closing the port 72 effecting communication between the chamber 73 and container 70 when said container is in the pouring position. The container is pivoted to the bottom 74 and is actuated by a connecting arm 75 in the same manner as illustrated and described in the preferred embodiment. A spring 76 is attached to the lower part of section 71 and to a projection formed on the partition 77 whereby the container is normally maintained in non-pouring position.

What I claim is:

1. A condiment receptacle having a bottom and a partition forming upper and lower chambers therein, a spout extending from said lower chamber, a measuring container pivoted to said bottom and operable in said spout, a valve pivoted above said container and connected thereto whereby movement of said container to dispensing position will close said valve and movement of said container to closed position will open said valve.

2. A condiment receptacle having a bottom and a partition forming upper and lower chambers therein, a spout extending from said lower chamber, a measuring container pivoted to said bottom and operable in said spout, a valve pivoted above said container and connected thereto whereby movement of said container to dispensing position will close said valve and movement of said container to closed position will open said valve, and manually operable means for actuating said container to dispensing position.

3. A condiment receptacle having a bottom and a partition forming upper and lower chambers therein, a spout extending from said lower chamber, a measuring container pivoted to said bottom and operable in said spout, a valve pivoted above said container and connected thereto whereby movement of said container to dispensing position will close said valve and movement of said container to closed position will open said valve, manually operable means for actuating said container to dispensing position, and means subjacent said bottom for actuating said container to closed position.

4. A condiment receptacle having a bottom and a partition forming upper and lower chambers therein, said partition formed with a discharge port, a spout extending from said lower chamber, a measuring container pivoted to said bottom and operable in said spout, and a valve member carried by said container whereby movement of said container to dispensing position will move said valve member to close said port and movement of said container to closed position will move said valve member to open said port.

JACK WOO.